United States Patent [19]

Knapp

[11] Patent Number: 4,492,147
[45] Date of Patent: Jan. 8, 1985

[54] RECIPROCATORY AIR MOTOR WITH CUSHIONING PISTONS

[75] Inventor: Wallace C. Knapp, Towson, Md.

[73] Assignee: Knapp Pneumatics, Inc., Baltimore, Md.

[21] Appl. No.: 567,164

[22] Filed: Dec. 30, 1983

[51] Int. Cl.³ .......................... F01L 25/06; F01B 11/02
[52] U.S. Cl. ..................... 91/306; 92/85 A; 92/85 B; 92/143
[58] Field of Search ............... 92/85 A, 85 B, 143; 91/306, 305

[56] References Cited

U.S. PATENT DOCUMENTS 3,094,902  6/1963  Riopelle .................................. 91/306
3,595,133  7/1971  Foster ..................................... 92/85 B
4,020,747  5/1977  Reynolds ................................ 92/85 B
4,179,983  12/1979  Wallace ................................. 92/85 B

*Primary Examiner*—Paul E. Maslousky
*Attorney, Agent, or Firm*—Clarence A. O'Brien; Harvey B. Jacobson

[57] ABSTRACT

A reciprocatory air motor has a main plunger valve the position of which controls the flow of air to opposite sides of a main motor piston. Positioning of the plunger valve is itself controlled by a pair of cushion pistons carried on the piston rod of the motor. A space between the cushion pistons is used for the compression of air to effect absorption of the kinetic energy of the moving parts of the motor at opposite ends of the stroke.

14 Claims, 11 Drawing Figures

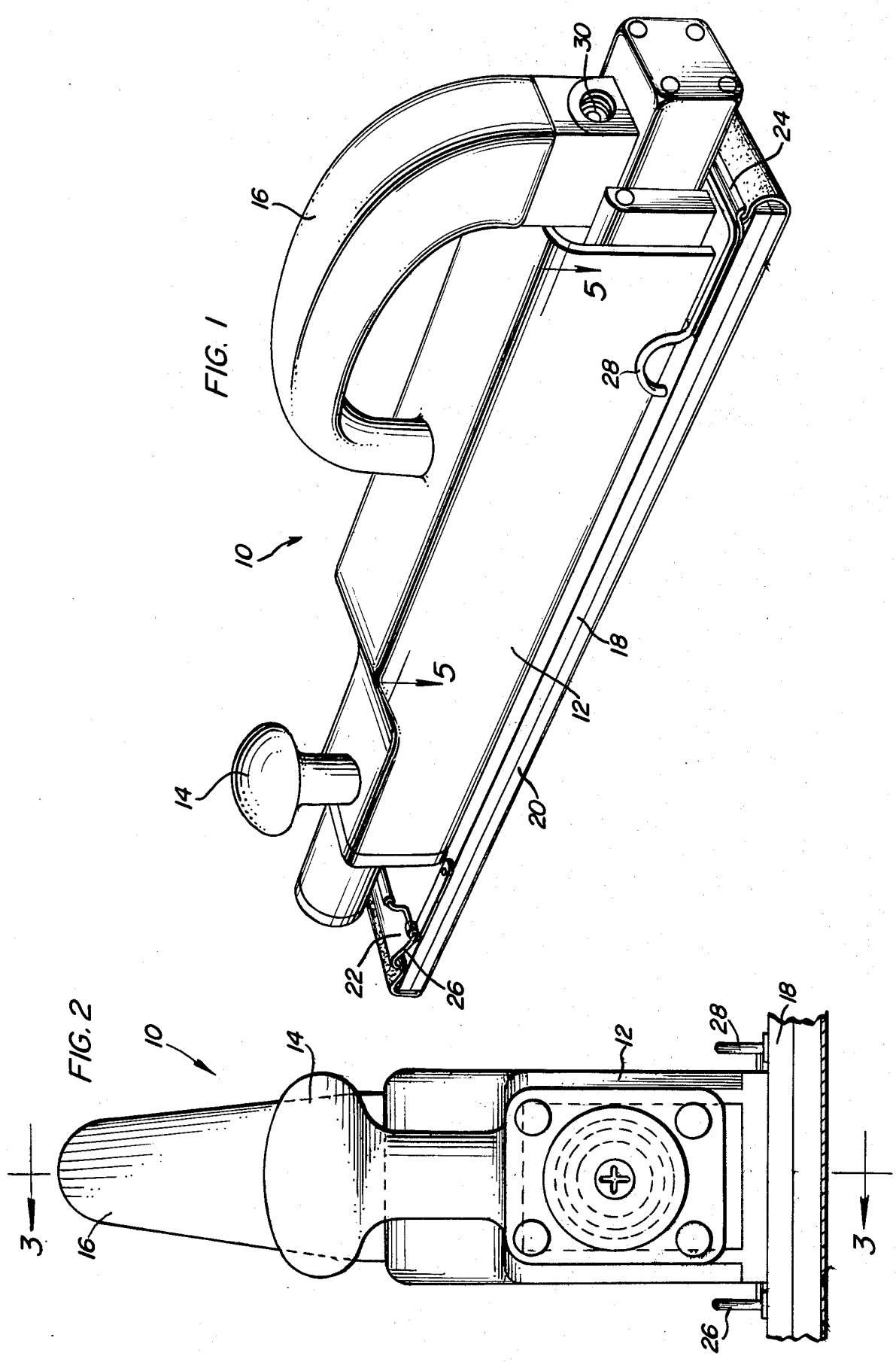

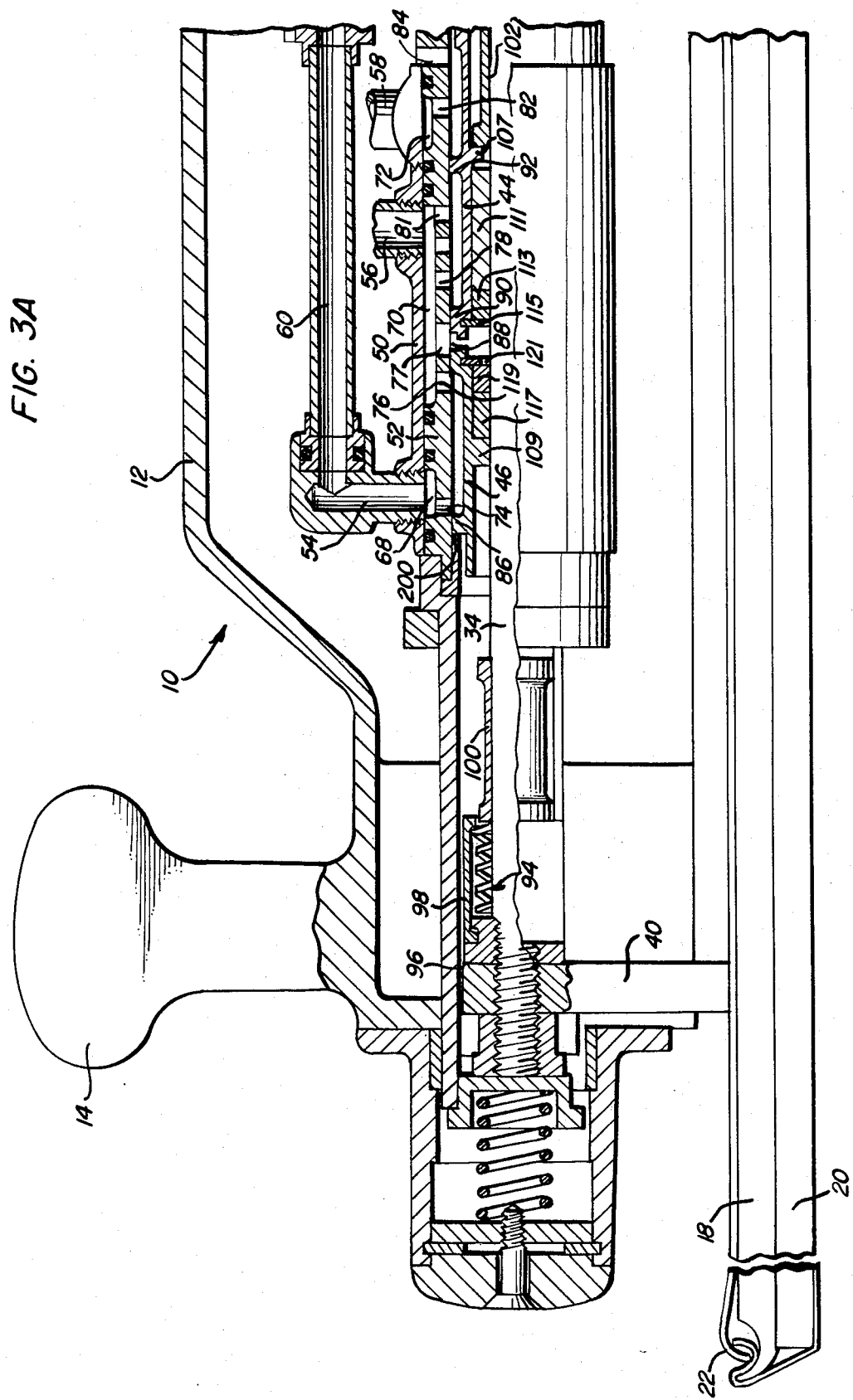

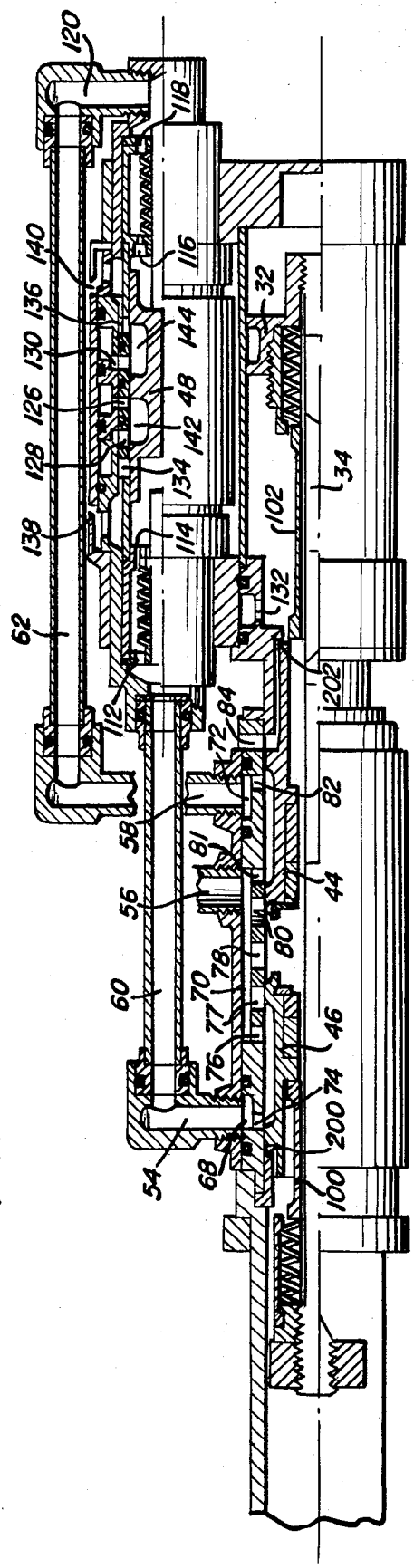
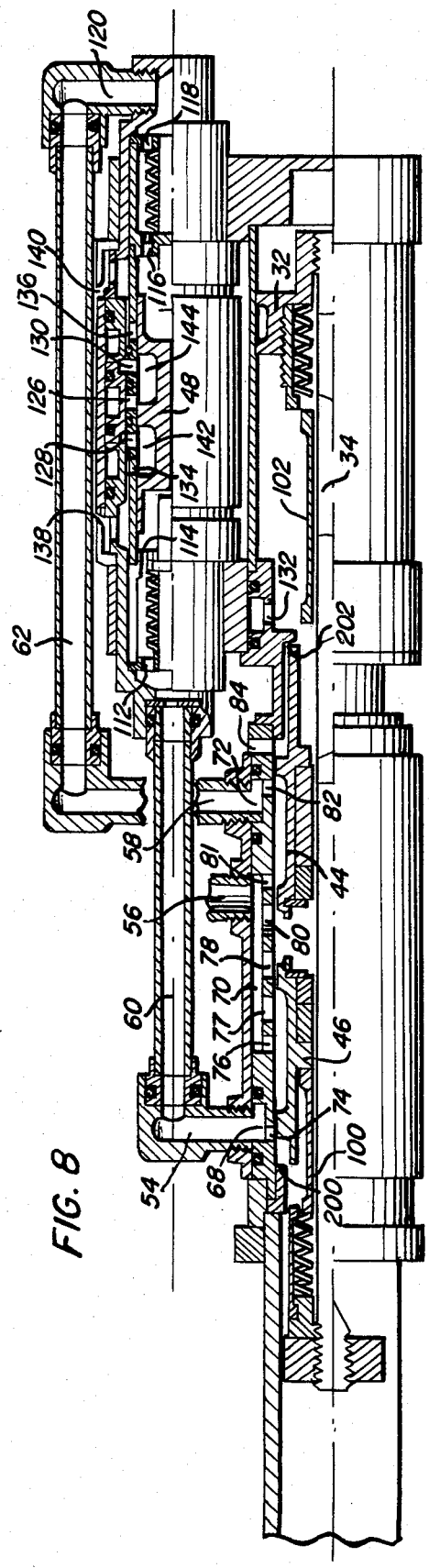
FIG. 7
FIG. 8

1

RECIPROCATORY AIR MOTOR WITH CUSHIONING PISTONS

BACKGROUND OF THE INVENTION

This invention relates to reciprocatory air motors particularly suitable for operating hand-held power tools such as reciprocatory sanding machines, saws, polishing or filing machines, and the like.

In a reciprocatory hand tool of the above kind driven by an air motor, the moving parts of the tool may reciprocate at relatively high speed, and consequently the moving parts of such tools may develop considerable kinetic energy which must be absorbed at each reversal of the stroke of the tool. If no means is provided in the tool for absorbing the kinetic energy developed by the moving parts of the tool during a stroke, such energy is translated into an impact force at the end of the stroke. These impact forces, which are repeated at the end of each stroke, may, at best, be irritating to an operator using the tool, but more realistically may be harmful both to the tool and to the operator.

The present invention seeks to provide a reciprocatory air motor which incorporates means whereby the kinetic energy developed by the moving parts of the motor (and the equipment it is used to operate) is usefully absorbed, and impact forces produced upon stroke reversals of the motor are effectively minimized.

DESCRIPTION OF THE PRIOR ART

Acknowledgement is made of the following U.S. patents pertaining to fluid motors:

| | |
|---|---|
| 364,081 | May 31, 1887 |
| 2,802,451 | Aug. 13, 1957 |
| 3,108,409 | Oct. 29, 1963 |
| 3,213,760 | Oct. 26, 1965 |
| 3,820,440 | June 28, 1974 |
| 4,068,727 | Jan. 17, 1978 |
| 4,210,064 | July 1, 1980 |

SUMMARY OF THE INVENTION

In accordance with the present invention, a reciprocatory air motor of the type having a main drive piston which is reciprocated by compressed air, is provided with kinetic energy absorbing means operative toward the end of each stroke of the main piston to absorb the kinetic energy of the moving parts thereby minimizing impact forces at the ends of the stroke, and to then return the absorbed energy to the moving parts for use in the subsequent reverse stroke thereof.

In a preferred form of the invention, a pair of reciprocating cushion pistons are associated with the main piston in a manner whereby, toward the end of a stroke of a main piston, the cushion pistons operate to compress air in a space therebetween to provide a cushioning action absorbing kinetic energy of the moving parts of the motor, the compressed air being useful in contributing toward movement of the moving parts of the motor during a subsequent return stroke, toward the end of which the cushioning pistons again operate to compress air in said space thereby repeating the energy absorbing function with each stroke of the main piston.

In accordance with a further preferred feature of the invention, the cushion pistons may be used to control airflow to opposite sides of a main valve plunger which itself controls air flow to the main piston in a manner whereby stroke reversals of the main valve plunger are controlled by the cushion pistons and stroke reversals of the main piston are controlled by the main valve plunger.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a portable sanding machine powered by a reciprocatory air motor in accordance with the invention.

FIG. 2 is a front elevational view of the sanding machine.

FIGS. 3 and 3A are cross-sectional views respectively of the rear section and front section of the machine taken on line 3—3 of FIG. 2, it being understood that these views when positioned end-to-end form a composite view of the whole machine.

FIGS. 7-10 are cross-sectional views of the air motor portion of the machine shown in FIGS. 1-5, showing the cushion pistons and main valve in different positions occupied during different stages of the forward and reverse strokes of the motor.

DESCRIPTION OF THE PREFERRED EMBODIMENTS

Figure 3:
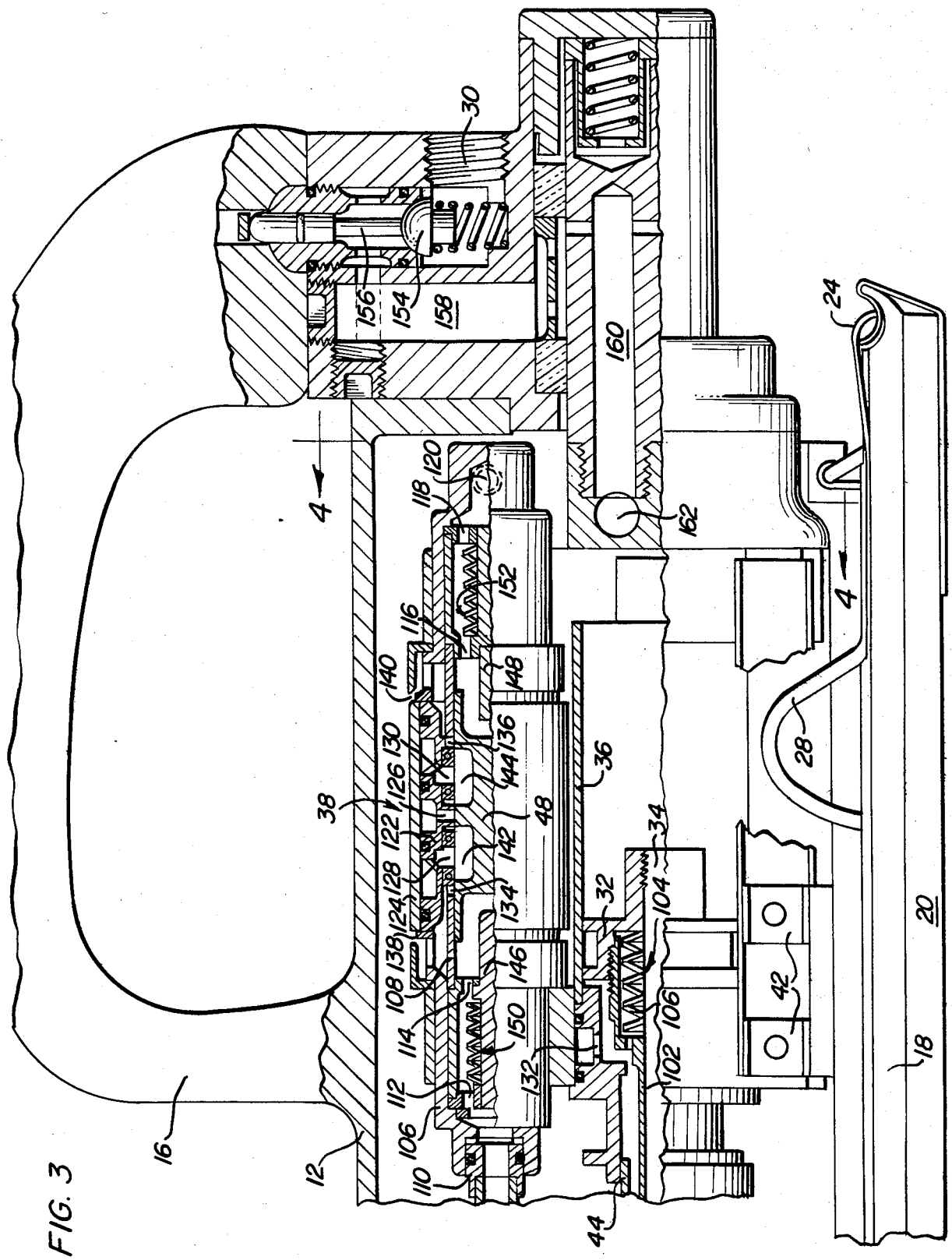
Figure 4:
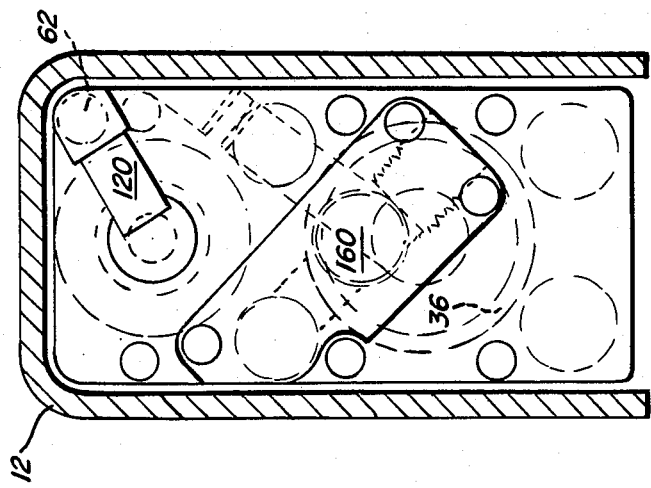
FIG. 4 is a cross-sectional view on line 4—4 of FIG. 3.

Referring initially to FIGS. 1 and 2, there is illustrated a portable pneumatically operated sanding machine 10 having a main body portion 12 equipped with front and rear handles 14, 16 and a slide 18 having a base pad 20 of resilient material such as foam rubber, to form a backing for a sheet of sandpaper, which may be positioned on the slide with its opposite ends held by toothed pivotal gripping jaws 22, 24. The jaws may, for example, be locked and released by locking toggles 26, 28 or the like. Body portion 12 of the machine incorporates a reciprocatory air motor in accordance with the invention for reciprocating the slide to provide a sanding action, the air motor, for example, being controlled by a trigger or the like (not shown) incorporated in handle 16. A threaded inlet connection 30 is provided for compressed air at supply pressure, typically between about 120 to 150 PSI.

The construction and operation of the air motor will be described in more detail with particular reference to FIGS. 3-5 and 7-10.

The basic operative components of the air motor comprise a main piston 32 threaded to one end of an elongate piston rod 34, and being adapted to reciprocate in a main cylinder 36 under the control of a valve assembly 38 which alternately directs compressed air from connection 30, as will be described, to opposite sides of the main piston, while also exhausting air from the appropriate side of the main cylinder. To the distal or forward end of piston rod 34 is threaded a connector 40, the base of which is welded or otherwise connected to the forward end of slide 18, so that the slide is caused to reciprocate with the piston rod, the rear portion of the slide being guided by suitable runners 42 in trackways or the like formed on the body portion 12 of the machine.

Surrounding a median part of piston rod 34 are an inner cushion piston 44 and outer cushion piston 46. The cushion pistons provide for cushioning of the moving parts of the motor toward the end of each stroke of the main piston, as will be described, to effectively absorb the kinetic energy thereof, and the cushion pistons also serve as control valves for directing compressed air from the supply alternately to opposite sides of a main valve plunger 48 of valve assembly 38 responsive to reciprocation of the main piston, so as to appropriately position the plunger 48 to supply air to the main piston for reciprocation thereof as required.

The cushion pistons 44 and 46 are disposed in a cushion piston housing 50 which is lined with an air distributor 52. Housing 50 has three air connections 54, 56 and 58. Connection 54 communicates through line 60 with the left end of the valve assembly 38, as will be described, and connection 58 communicates through a similar line 62 (FIG. 5 and FIGS. 7-10) to the right end of valve assembly 38. Connection 56 communicates with a tube 64 which receives compressed air from the supply connector 30. A one-way check valve 66 is included in the flow connection between tube 64 and connection 56. Air distributor 52 has external peripheral grooves 68, 70, 72 and ports 74, 76, 77, 78, 80, 81, 82 and 84 for the direction and distribution of air as between the connections 54, 56 and 58 dependent on the positions of the cushion pistons. Cushion piston 46 has external flanges 86, 88 and cushion piston 44 has similar flanges 90, 92. The flanges cooperate with the air distributor ports for airflow distribution and direction.

Adjacent to support 40 at the outer end of piston rod 34 is a retainer assembly for a stack of Belleville washers 94 which embrace the piston rod. The retainer assembly comprises an end piece 96 threaded onto the piston rod and a washer retaining housing 98 secured to the end piece. A reel-shaped spacer 100 is loosely retained on the piston rod 34 between the washer stack 94 and cushion piston 46. A similar reel-shaped spacer 102 is loosely received on the piston rod between cushion piston 44 and another Belleville washer stack 104 positioned in a retainer 106 threaded onto the main piston 32.

Cushion piston 44 has an internal shoulder 107 which, in operation, is contacted by spacer 102 to move the piston from right to left, as will be described, and cushion piston 46 has a similar internal shoulder 109 adapted to be contacted by spacer 100 to move the piston from left to right as will be described. Cushion piston 44 reciprocates on the main piston rod on a plastic filler 111 and metal seal piece 113 held in place by a retainer ring 115. Similarly, cushion piston 46 rides on a plastic filler 117 and a metal seal piece 119 held in place by a retainer ring 121. Close diametral fits of cushioning piston shoulder 109 against spacer 100 effects air cushioning to minimize noise of metal to metal contact.

The main valve assembly 38 comprises a tubular housing 106 having a liner 108 defining a cylinder in which the main valve plunger 48 is adapted to reciprocate. As previously stated, the left end of housing 106 is in communication with line 60 through a connection 110, and ports 112, 114 provide communication between line 60 and the left end of cylinder 108. Similarly, the right end of cylinder 108 is in communication with line 62 through ports 116, 118 and connection 120. Externally of cylinder 108 is an air distributor 122 received in an outer housing member 124. Distributor 122 defines a central air inlet port 126 which receives compressed air from inlet connection 30. Outer ports 128, 130 communicate respectively with opposite ends of main cylinder 36. Port 128 communicates with the left end of cylinder 36 through a cylinder port 132 and connecting ducts (not shown) and port 130 communicates with the right end of cylinder 36 through a similar cylinder port and ducting, also not shown. Further ports 134, 136 in cylinder 108 communicates respectively with exhaust port 138, 140 in outer housing member 124, the exhaust ports being open to the atmosphere.

Main valve plunger 48 is adapted to reciprocate in cylinder 108 under the influence of variations of air pressure in lines 60 and 62 as will be described. The valve plunger has external grooves 142, 144 for alternately placing one of ports 128, 130 in communication with the central air supply port 126, while placing the other of ports 128, 130 in communication with the atmosphere, thereby controlling reciprocation of main piston 34 in cylinder 36. Valve plunger 48 is cushioned at opposite ends of the stroke by bumper pistons 146, 148 resiliently located against Belleville washer stacks 150, 152. Compressed air enters the machine through inlet connection 30, and the supply is controlled by a spring loaded plunger valve 154 operated by a depressible pin 156 through the aforementioned trigger (not shown) associated with handle 16. From valve 154 the air flows through ducts 158 and 160 to a connector 162. Here the supply of air is split into two branches, one of which flows via tube 64 and check valve 66 to inlet connection 56 in cushion piston housing 50, and the other of which flows to inlet port 126 of the main valve assembly.

For a better understanding of the invention, not all of the air ducts and the like have been illustrated in the drawings, but the construction of these is not critical to the invention and may follow standard engineering practice.

An operating cycle of the motor will now be described with particular references to FIGS. 7-10.

In FIG. 7, the main valve plunger 48 is shown at its extreme right position. Line pressure air enters the main valve through port 126, and passes through ports 128 and 132 to the left end of main piston 32. Open passages from the right end of the main piston to port 130 allow the air at the right end of the main piston to exhaust through ports 130, 136 and 140 to atmosphere. Therefore, while the valve plunger 48 is at its extreme right position, the main piston and piston rod 34 are caused to move to the right.

Piston rod 34 is shown in FIG. 7 at a position in which the left piston rod spacer 100 has contacted the outer cushion piston 46 and moved the cushion piston a short distance. Line high pressure air enters port 56 and flows through port 78 into the space between the inner cushion piston and the outer cushion piston. The pressure on the right side of the outer cushion piston multiplied by the exposed cushion piston area gives a shock absorbing force which absorbs the kinetic energy of the working parts moving to the right. This cushioning force is effective as soon as the cushion piston is moved away from its left shoulder 200. This cushioning force increases with movement of the outer cushion piston 46 because the volume of air between the cushion pistons decreases and the check valve 66 of FIG. 5 prevents backward flow of air. The cushioning force also maintains contact between the outer cushion piston 46 and spacer 100 and assists in the initial movement of the main piston 32 to the left until the outer cushion piston contacts shoulder 200.

Figure 10:
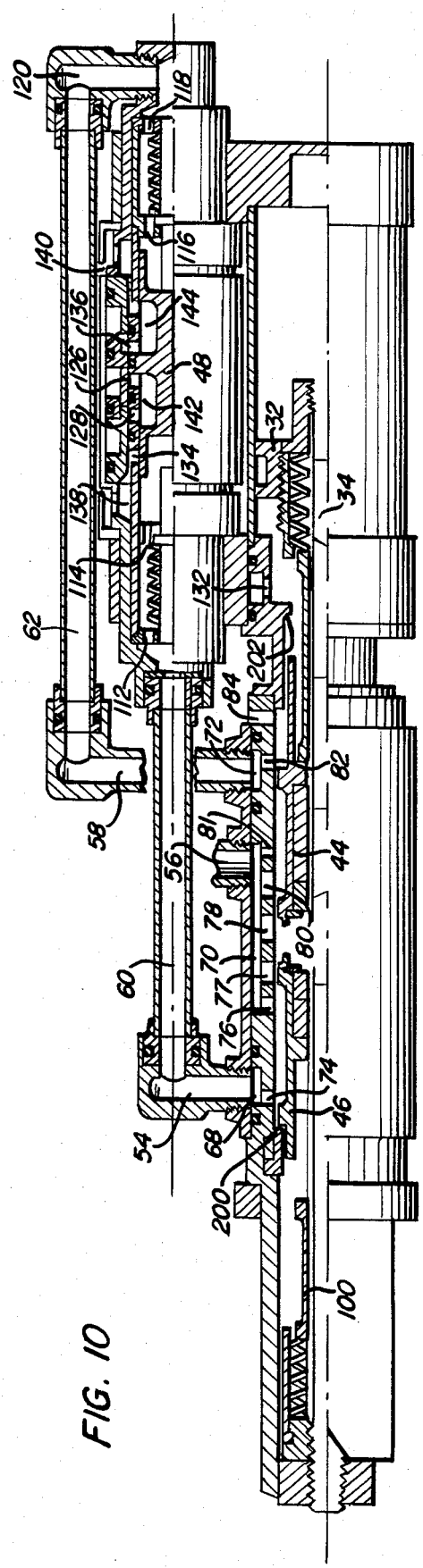

The position of the main valve plunger is controlled by the movement of the cushion pistons. In FIG. 7 and FIG. 10, the left end of plunger 48 is exposed to line high pressure air from connection 56, through ports 76 and 74, connection 54, line 60 and ports 112 and 114. In FIG. 10, the right end of plunger 48 is open to atmosphere through ports 116, 118, connection 120, line 62, connection 58, and ports 82 and 84 causing the plunger 48 to move to the right. The outer cushion piston as shown in FIG. 7 has not moved sufficiently to exhaust air from the left end of the main valve plunger 48, and therefore has not caused the main valve plunger to move to the left.

FIG. 8 shows the main valve plunger 48 having moved from its extreme right position to its extreme left position. The movement of the main valve plunger from right to left was caused by sufficient movement of the outer cushion piston 46 to the right to open port 74 to the atmosphere through the left end of the casing. This movement of the main valve plunger from right to left takes place only during the end of the stroke to the right of the main piston 32. The air to the left side of the main valve plunger thus exhausts through ports 114, 112, line 60, connector 54 and port 74. Line air pressure entering through connection 56 passes to the right end of main valve plunger 48 through ports 81 and 82, connection 58, line 62, connection 120 and ports 118 and 116. Thus, the main valve plunger is moved to its extreme left position.

Movement of the main valve plunger from its right end position to its left end position causes the line air pressure to reverse from the left to the right side of main piston 32, and also causes the air to exhaust from the left side of the main piston, so that the main piston is moved from right to left.

Although FIG. 8 shows the main valve plunger 48 in position to reverse the direction of travel of the main piston from the right to the left, the kinetic energy of motion to the right must first be absorbed to bring the movement to the right to a stop. This kinetic energy is absorbed mainly by movement of the outer cushion piston 46. Although the outer cushion piston can move freely absorbing energy until it contacts the inner cushion piston, its capacity to absorb kinetic energy is preferably designed so that all of the kinetic energy of the moving working parts is absorbed at maximum speed and the motion thereof is brought to a stop before the outer cushion piston contacts the inner cushion piston. Metallic contact between the two cushion pistons may cause excess noise and impact stress.

Figure 9:
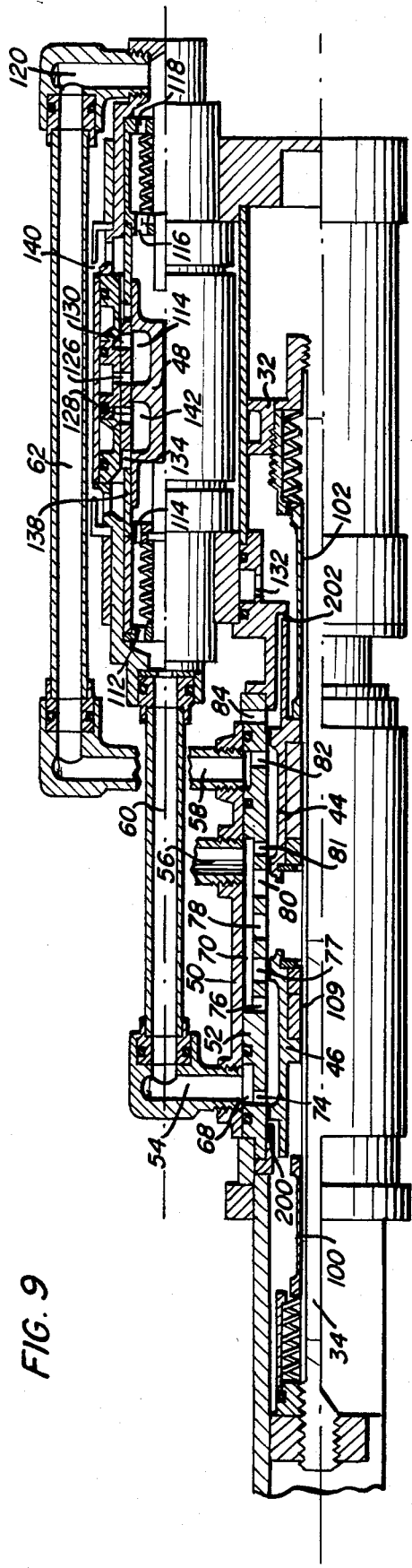

FIG. 9 shows main valve plunger 48 still in its left end position due to the outer cushion piston movement described above. Main piston 32 is moving to the left, and the right piston rod spacer 102 has just made contact with inner cushion piston 44. As soon as the inner cushion piston breaks contact with its right end shoulder 202, the line air pressure in the space between the cushion pistons exerts a force against inner cushion piston 44 which opposes the motion to the left of the main piston and attached working parts. This cushioning force also increases as the inner cushion piston 44 moves to the left due to the decrease in air volume between the cushion pistons causing the air pressure to increase. This increase in air pressure between the cushion pistons is higher than line air pressure and the higher pressure air is prevented from flowing backwards by the check valve 66 (shown in FIG. 5).

FIG. 10 shows the valve plunger 48 having moved back from its left position to its right position due to reversal of the porting connections associated with lines 60 and 62, effected by movement to the left of the inner cushion piston. This left to right reversing motion of the main valve plunger 48 takes place only near the end of the stroke to the left of the main piston 32. As in the left to right stroke of the main piston described above, in the right to left stroke, the inner cushion piston continues to be forced to the left by the right piston rod spacer 102 until all of the kinetic energy of the main piston and its attached moving parts is absorbed by the braking inner cushion piston. The braking force of the inner cushion piston increases as it moves to the left because the volume of air between the cushion pistons decreases and the check valve in the inlet passage 56 prevents the air from flowing back.

Immediately after the kinetic energy of the motion to the left is completely absorbed, and the main piston with its attached moving parts and the inner cushion piston come to a stop, movement to the right begins. The energy which has been absorbed by the inner cushion piston is returned to kinetic energy of the working parts moving to the right. This energy is imparted in terms of the average force of the inner cushion piston against the right piston rod spacer multiplied by its distance of travel.

Figure 6:
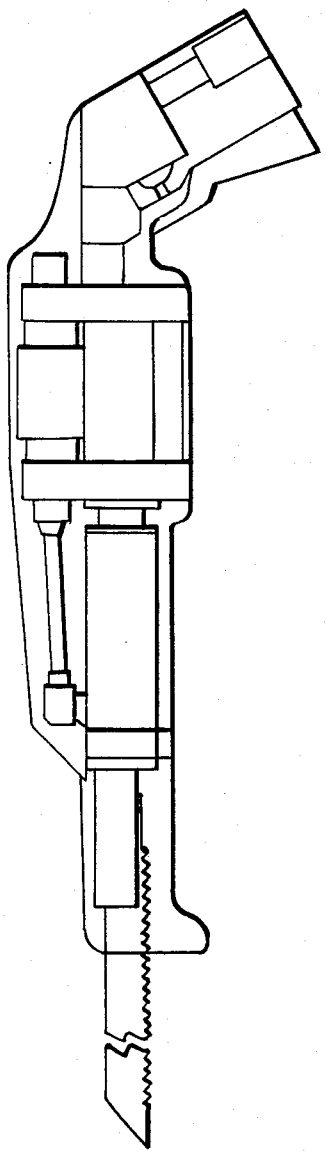
FIG. 6 is a somewhat diagrammatic side view of a portable power saw operated by a reciprocatory air motor in accordance with the invention.
Figure 5:
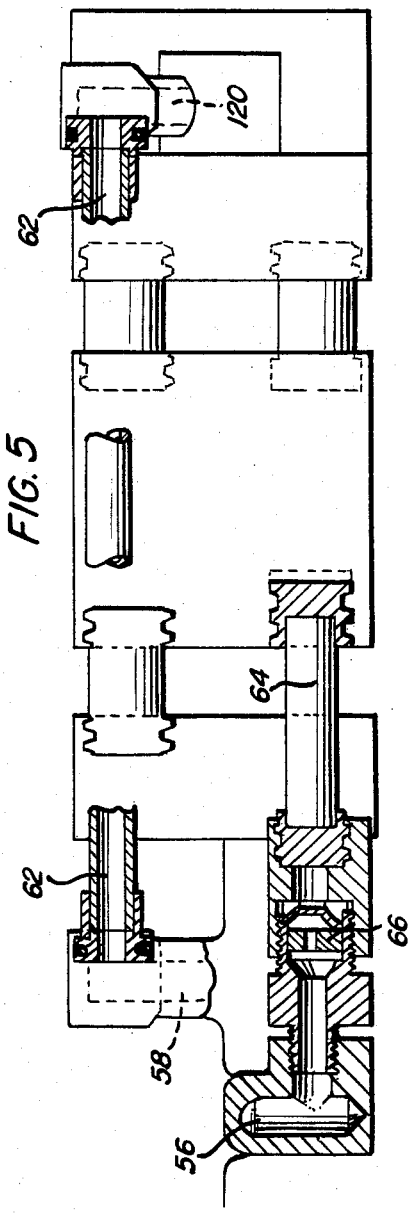
FIG. 5 is a cross-sectional view on line 5—5 of FIG. 1.

FIGS. 7-10 illustrate the principles of operation of the air motor and while in the previous Figures, the motor was described in conjunction with a hand held sanding machine, it will be appreciated that air motors of this type have diverse uses. Thus, for example, FIG. 6 shows the outline of a hand held pneumatic saw which can utilize a motor as described above.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A reciprocatory motor having a main piston, means for providing reciprocation of the main piston in a main cylinder of the motor, and means for absorbing kinetic energy of the main piston during each stroke thereof, the energy absorbing means comprising a pair of cushion pistons received in a cushion piston housing and control means for providing relative movement between the cushion pistons on each stroke of the main piston so as to compress gas in a space between the cushion pistons and for translating the compression of gas between the cushion pistons into absorption of kinetic energy of the main piston.

2. The invention of claim 1 including a piston rod connected to the main piston, the cushion pistons comprising inner and outer cushion pistons carried on the piston rod for movement therewith and therealong, the control means including an inner cushion piston spacer on the piston rod between the main piston and the inner cushion piston for moving the inner cushion piston away from an inner shoulder of said housing toward the outer cushion piston responsive to movement of the main piston in one direction, and an outer cushion piston spacer on the piston rod between the outer cushion piston and a distal end of the piston rod for moving the outer cushion piston away from an outer shoulder of said housing toward the inner cushion piston responsive to movement of the main piston in the opposite direction.

3. The invention of claim 2 wherein the means for providing reciprocation of the main piston comprises a main valve assembly for alternately supplying high pressure air from a compressed air source to one and the other end of the main cylinder while alternately exhausting air from the other and said one end of the main cylinder.

4. The invention of claim 3 wherein the main valve assembly comprises a valve housing having an inlet port for receiving compressed air from said source, outlet ports for directing compressed air from the inlet port respectively to opposite ends of the main cylinder, and exhaust ports for communication respectively with the opposite ends of the main cylinder, the valve assembly further including a valve plunger movable in the valve housing between first and second positions for alternately connecting the respective ports to the inlet port and opening the respective exhaust ports so as to control the reciprocation of the main piston in the main cylinder.

5. The invention of claim 4 including an inlet for admitting compressed air to the cushion piston housing, pneumatic connections between opposite ends of the cushion piston housing and the main valve housing, and port means in the cushion piston housing between said inlet and said connections, the port means being controlled by the cushion pistons for effecting movements of the valve plunger between said first and second positions responsive to movements of the cushion pistons in the cushion piston housing.

6. An air motor comprising a main piston mounted for reciprocation in a main cylinder, a main valve assembly including a valve housing having a movable valve plunger therein for directing compressed air from a compressed air source to alternate ends of the main cylinder while exhausting air from respective opposite ends of the main cylinder responsive to movements of the valve plunger in the valve housing, and a pair of relatively movable cushion pistons associated with the main piston for absorbing the kinetic energy of the main piston during each stroke thereof by compressing air between the cushion pistons and for directing compressed air from said source to the main valve assembly so as to control movement of the valve plunger responsive to movements of the cushion pistons thereby effecting stroke reversals of the main piston.

7. The invention of claim 6 including a piston rod connected with the main piston, the cushion pistons comprising inner and outer cushion pistons carried for movement with and along the piston rod in a cushion piston housing extended from the main cylinder, the cushion piston housing having an inlet for receiving compressed air from said source, outlets at opposite ends of the cushion piston housing connected respectively to opposite ends of the valve housing, and port means in the cushion piston housing between the inlets and the outlets for directing compressed air from said inlet to a space between the cushion pistons and for alternately connecting one and the other of said outlets to said inlet while exhausting the other and said one of the outlets, opening and closing of the port means being controlled by movement of the cushion pistons responsive to movements of the main piston.

8. The invention of claim 7 wherein the inner and outer cushion pistons have respective terminal positions engaging inner and outer shoulders respectively of the cushion piston housing, and wherein the piston rod carries an inner piston spacer thereon between the main piston and inner cushion piston for engaging and initiating movement of the inner cushion piston away from said inner shoulder during movement of the main piston in one direction, the piston rod further carrying an outer piston spacer thereon between a distal end of the rod and the outer cushion piston for engaging and initiating movement of the outer cushion piston away from said outer shoulder during movement of the main piston in a reverse direction.

9. The invention of claim 8 including inner mechanical cushioning means on the piston rod between the main piston and the inner piston spacer and outer mechanical cushioning means on the piston rod between the distal end thereof and the outer piston spacer.

10. The invention of claim 9 wherein the inner and outer mechanical cushioning means each comprises a stack of Belleville washers.

11. The invention of claim 6 including mechanical cushioning means at opposite ends of the valve housing for cushioning movements of the valve plunger.

12. The invention of claim 11 wherein each cushioning means comprises a stack of Belleville washers.

13. An air motor comprising a main piston mounted for reciprocation in a main cylinder, a piston rod extending from the main piston, inner and outer cushion pistons mounted for movement with and along the piston rod in a cushion piston housing, a main valve assembly including a valve plunger mounted for movement in a valve housing between opposite terminal positions, said valve housing having an inlet for connection to a source of compressed air, outlets communicating with the respective ends of the main cylinder, and port means controlled by the valve plunger responsive to movements thereof between said positions for alternatively connecting one and the other of said outlets with the inlet while connecting the other or said one outlet to exhaust so as to effect reciprocatory movement of the main piston in the main cylinder, the cushion piston housing having an inlet for compressed air, outlets at the respective ends thereof connected respectively with opposite ends of the main valve housing, and port means controlled by the cushion pistons responsive to movements thereof initiated by movements of the main piston for alternately connecting one or the other of said outlets to said inlet while connecting the other or said one of the outlets to exhaust whereby the valve plunger is reciprocated in the valve housing between said positions.

14. The invention of claim 13 wherein the cushion piston housing further includes means for connecting the inlet with a space between the cushion pistons whereby compression of air of said space between the cushion pistons is effective to absorb kinetic energy of the main piston during each stroke thereof, and a non-return valve associated with said inlet for preventing return flow of air through said inlet from said space between the cushion pistons.

* * * * *